United States Patent [19]
Lewarchik et al.

[11] Patent Number: 5,623,027
[45] Date of Patent: Apr. 22, 1997

[54] SILICONE-MODIFIED ALIPHATIC POLYESTER

[75] Inventors: Ronald J. Lewarchik, Sleepy Hollow; Marc L. Smith, Crystal Lake, both of Ill.; Edward J. Holzrichter, Redlands, Calif.

[73] Assignee: Morton International, Inc., Chicago, Ill.

[21] Appl. No.: 394,022

[22] Filed: Feb. 21, 1995

Related U.S. Application Data

[63] Continuation-in-part of Ser. No. 155,063, Nov. 19, 1993, abandoned.

[51] Int. Cl.⁶ .................................................. C08G 63/695
[52] U.S. Cl. .................. 525/466; 528/26; 528/29
[58] Field of Search .............................. 525/466; 528/26, 528/29

[56] References Cited

U.S. PATENT DOCUMENTS

| | | | |
|---|---|---|---|
| 3,691,258 | 9/1972 | Riemhofer et al. | 260/850 |
| 5,097,006 | 3/1992 | Kapilow et al. | 508/272 |

*Primary Examiner*—Margaret Glass
*Attorney, Agent, or Firm*—Wayne E. Nacker; Gerald K. White

[57] ABSTRACT

A silicone/polyester adduct comprises between about 5 and about 30 wt % of silicone adducted to between about 70 and about 95% polyester chains formed from polyfunctional acids plus polyfunctional acids and/or anhydrides. At least about 50 mole percent of the polyfunctional acids and/or anhydrides are cycloaliphatic.

2 Claims, No Drawings

SILICONE-MODIFIED ALIPHATIC POLYESTER

This is a continuation-in-part of U.S. application Ser. No. 08/155,063 filed 19 Nov. 1993, abandoned.

The present invention is directed to silicon-modified polyesters and coatings formed therefrom having improved weatherability. More particularly, the invention is directed to silicon-modified polyesters formed from cycloaliphatic monomers.

BACKGROUND OF THE INVENTION

It is known to modify polyesters used as coating binders by chemically adducting polyesters to silicone resins. Polyesters heretofore used to form silicone-polyester adducts were formed from multifunctional alcohols and multifunctional, primarily aromatic, carboxylic acids and/or anhydrides.

It is a general object of the present invention to provide silicone-polyester adduct resins having several improved properties.

SUMMARY OF THE INVENTION

Herein, silicone-polyester adduct resins are provided containing between about 5 and about 30 wt % silicone resin. The polyester is formed from polyfunctional alcohols and multifunctional acids and/or anhydrides, at least about 50 mole percent of the multifunctional carboxylic acids and/or anhydrides being cycloaliphatic. Coating compositions comprising the silicone-polyester adducts of the present invention and a cross-linking agent therefore provide coatings with improved weatherability.

DETAILED DESCRIPTION OF CERTAIN PREFERRED EMBODIMENTS

Silicone resins useful for forming silicone-polyester adduct resins in accordance with the present invention have between about 5 and about 30 wt % silicone content, i.e., Si—O—Si, plus Si—R groups plus Si—O—$R^1$, where R is phenyl or alkyl, generally methyl or ethyl, methyl being a preferred alkyl, $R^1$s being methyl or ethyl. The R group may vary from entirely phenyl to entirely alkyl; however, a mixture of R groups, particularly methyl and phenyl are preferred. Most preferred silicone resins have as Si—R linkages, primarily Si—Ph and Si—Me in ratios between about 1:1 and about 2:1.

The polyesters which are adducted with the silicone resins are formed from polyfunctional alcohols and polyfunctional carboxylic acids and/or anhydrides. In accordance with the present invention, at least about 50 mole percent, preferably at least about 70 mole percent and most preferably at least about 98 mole percent of the polyfunctional carboxylic acid content of the polyester comprises cycloaliphatic monomers. Cycloaliphatic polycarboxylic acids provide enhanced ultraviolet light transparency and therefore improved weatherability relative to aromatic polycarboxylic acids. Cycloaliphatic polycarboxylic acids provide greater coating hardness relative to linear aliphatic carboxylic acids. Preferred cycloaliphatic polycarboxylic acids are "cyclohexanedicarboxylic acids". By "cyclohexanedicarboxylic acids" are meant the 1,2, 1,3 and 1,4 isomers, the 1,2 isomer anhydride (hexahydrophthalic anhydride), and ring-alkylated derivatives of each, e.g., derivatives in which one or more alkyl group(s) of up to about seven carbon atoms is bound to the cycloaliphatic rings.

The balance of the polycarboxylic acid and/or anhydride content of the polyester comprises aliphatic and/or aromatic polycarboxylic acids. Examples of aromatic polycarboxylic acids are phthalic acid and its anhydride, isophthalic acid, benzophenone dicarboxylic acid, diphenic acid, 4,4-dicarboxydiphenyl ether, 2,5-pyridine dicarboxylic acid, trimellitic acid, etc. Examples of aliphatic polycarboxylic acids include succinic acid, glutaric acid, adipic acid, pimelic acid, suberic acid, azelaic acid, sebacic acid, diglycolic acid, 1,12-dodecanoic acid, tetrapropenyl succinic acid, maleic acid, fumaric acid, itaconic acid, malic acid, etc.

The polyol content is preferably all or substantially all, i.e. at least about 90 mole percent, aliphatic or cycloaliphatic polyols. Aromatic polyols, like aromatic polycarboxylic acids, tend to detract from the weathering stability of coatings formed from the resins. Examples of non-cyclic polyols include 1,6-hexanediol, pentaerythritol, trimethylolpropane, 2-methyl-1,3-propanediol, neopentyl glycol, 2-butyl-2-ethyl-1,3-propanediol, ethylene glycol, 1,4-butanediol, 1,3-butanediol, 1,5-pentanediol, trimethylol ethane, etc. Example of cycloaliphatic polyols include 1,4-cyclohexanediol, 1,4-cyclohexanedimethanol, hydrogenated bisphenol A, etc.

The entire amount of the polyester content may be reacted with silicone resin. Alternatively, polyester may be reacted with a high level of silicon resin and the resulting adduct admixed with additional non-adducted polyester to achieve the desired silicone content in the silicone-polyester adduct resin.

It is desired that a coating composition formed from a silicon-polyester adduct resin have a combination of a pencil hardness of at least B, preferably at least HB and a flexibility of 4T or more flexible, preferably at least 2T or more flexible. While silicone tends to enhance the flexibility of a polyester when adducted thereto, it also tends to reduce the hardness from that of the non-adducted polyester. Accordingly, the polyester or polyester portion which is reacted with the silicone resin is preferably a hard polyester. Hardness is achieved in polyesters by using at least a portion of monomers (polyol or polycarboxylic acid) having functionality greater than 2, thereby providing substantial branching. Typically, the desired branching is achieved by using polyols of functionality greater than 2. Preferably, at least about 20 mole percent of the monomer content of the polyester or polyester portion reacted with the silicone resin has hydroxyl and/or carboxylic acid functionality of 3 or more.

Polyesters useful in this invention have hydroxyl numbers of from about 10 to about 120, preferably from about 20 to about 80 and acid numbers from about 2 to about 20, preferably between about 5 and about 10. The weight average molecular weight (Mw) may range from about 1,000 to about 40,000, preferably between about 1,500 and about 10,000. The polyester(s) may be produced by any of the conventional processes, preferably with the use of a catalyst as well as passage of an inert gas through the reaction mixture to protect against discoloration and to aid in the liberation of water from the mixture as it is produced by the condensation. Esterification takes place almost quantitatively and may be monitored by determining the acid and/or hydroxyl numbers or by monitoring the Gardner-Holt viscosity of the product.

Adduct formation between the silicone resin and the polyester is achieved by an alcoholysis reaction between —OH groups of the polyester and —O—R groups of the silicone resin. R—OH, e.g., methanol is released.

The polyesters are typically made up in organic solvents, such as 1-methyoxy-2-propanol acetate, cyclohexanone, 1-butanol, xylene, high boiling aromatic solvents, such as Aromate® 100 and 150, etc. and mixtures thereof.

The polyesters, having hydroxyl groups, are curable through the hydroxyl groups, preferably with aminoplasts, which are oligomers that are the reaction products of aldehydes, particularly formaldehyde, with amino- or amido-group-carrying substances exemplified by melamine, urea, dicyandiamide, and benzoguanamine. Hydroxyl cross-linking agents are also described, for example in U.S. Pat. No. 2,940,944 and German patent applications 1,060,596, 1,083, 548 and 1,089,549. Especially advantageous are the aminoplasts, which are modified with alkanols having from one to four carbon atoms. It is preferable in many instances to employ precursors of aminoplasts such as hexamethylol melamine, dimethylol urea, hexamethoxymethyl melamine, and the etherified forms of the others. Thus, a wide variety of commercially available aminoplasts and their precursors can be used for combining with the linear polyesters of this invention. Particularly preferred are the amino crosslinking agents sold by American Cyanamid under the trademark Cymel. In particular, the Cymel 301, Cymel 303, and Cymel 385 alkylated melamine-formaldehyde resins are useful. Of course, it is possible to use mixtures of all of the above N-methylol products. Hydroxyl-reactive cross-linking is generally provided in an amount sufficient to react with at least one-half the hydroxyl groups of the polyester, i.e., be present at least one-half the stoichiometric equivalent of the hydroxyl functionality. Preferably, the cross-linking agent is sufficient to substantially completely react with all of the hydroxyl functionality of the polyester, and cross-linking agents having nitrogen cross-linking functionality are provided in amounts of from about 2 to about 12 equivalents of nitrogen cross-linking functionality per equivalent of hydroxyl functionality of the polyester. This typically translates to an aminoplast being provided at between about 10 and about 70 phr.

In addition to the binder and cross-linking agent, a coating composition may contain up to about 50 wt. percent pigments and fillers, although for clear coatings no pigment or filler may be included. Other additives known in the art, such as flow modifiers, viscosity modifiers and other binders may be dispersed in the coating composition. A catalytic amount of a strong acid such as p-toluenesulfonic acid may be added to the composition just before it is applied to a substrate to hasten the cross-linking reaction.

The coating composition thus obtained may be applied to sheet metal such as is used for automobile and airplane bodies; architectural metal skins, e.g., siding and window frames; and the like by spraying, dipping, or brushing but is particularly suited for a coil coating operation wherein the composition is wiped onto the sheet as it unwinds from a coil and then baked as the sheet travels toward an uptake coil winder. It is also contemplated for use in the so-called "plate coater", available from Alcan Aluminum, whereby the composition is extruded as a thin coating onto the sheet metal and then smoothed by a doctor blade. The baking temperature in any event may be from about 100° C. to about 300° C.

Coatings employing the silicon-polyester adduct of the present invention have a high degree of elasticity and a high degree of hardness, as well as high gloss and resistance to weathering.

Coatings employing the silicon-polyester adduct of the present invention are found to have some surprising and unexpected advantages relative to coatings formed from silicon-polyester adducts in which the polyester is formed from aromatic acids and anhydrides.

One very significant advantage is that, in contrast to coatings formed from silicon-aromatic polyester adducts, coatings formed from the silicon-polyester adducts are recoatable. That is, the coating may be applied to a substrate, heat-cured, additional coating applied thereto, and heat cured. No additional priming is required between the first application and the second application of coating. This advantage is very significant to coil coaters. It is not infrequent that a coil coating run is unsatisfactory, e.g., the coating applied is too thin. With silicon-aromatic polyester adduct-based coatings, if a run is defective, a primer must be applied before the second layer of coating is applied. The silicon-polyester adducts of the present invention eliminate the need for such a priming run, resulting in significant cost savings.

Another surprising advantage of coatings formed from the silicon-polyester adduct of the present invention which translates to significant cost savings for coil coaters is performance on the Leneta test. The Leneta test is a test for coating defects as a function of coating thickness. The coating is drawn onto a substrate as in a wedge-shaped profile, providing a continuum of thin to thicker coating. Defects, such as popping, are noted at the various thicknesses. Coatings based on the silicon-polyester adducts of the present invention are defect-free to a substantially greater thickness than are silicon-aromatic polyester-based coatings. In coil coating, improved performance on the Leneta test corresponds to the speed at which the coating line may be run. A very significant factor in the cost of coil coating is the amount of time the coil is on the line. Thus, a coating which permits higher line speed provides significant cost savings. The cycloaliphatic monomers used in forming the polyesters used in the present invention are more expensive than aromatic monomers, but the improved properties provided by the silicon-polyesters of the present invention more than compensate on a cost basis for the increased monomer cost.

Coatings based on the silicon-polyester adducts of the present invention also are more resistant to saponification than similar aromatic-based adducts. This means that they hold up better in corrosive environments. They also perform better in a boiling water test, a good indication of coating integrity for a number of years.

The invention will now be described in greater detail by way of specific examples.

EXAMPLE 1

(Compositions For Coil Application)

Polymer Formulations:

| Polymer "A" Cycloaliphatic Polyester | | |
|---|---|---|
| Ingredient | grams | moles |
| trimethylolpropane[1] (TMP) | 1041.6 | 7.77 |
| hexahydrophthalic anhydride[2] (HHPA) | 428.8 | 2.78 |
| 1,4-cyclohexanedicarboxylic acid (CHDA) | 479.0 | 2.78 |
| tetrabutyl titanate (TBT) | 1.0 | |
| xylene | 55.6 | |
| 1-methoxy-2-propanol acetate | 700.0 | |

[1]2-ethyl-2-hydroxymethyl-1,3-propanediol
[2]hexahydro-1,3-isobenzofurandione

The trimethylolpropane, hexahydrophthalic anhydride, 1,4-cyclohexanedicarboxylic acid and tetrabutyl titanate were charged to a 3 liter resin reaction flask equipped with an agitator, packed column, condenser, thermometer and inert gas inlet. The reactor was flushed with inert gas and the reactants heated to 227° C. over a period of about six hours while removing water. The reaction was continued for about 7 hours until the acid value was 8.5 and the viscosity of a sample at 60% solids in 1-methoxy-2-propanol acetate was S (Gardner Bubble). The batch was cooled and 1-methoxy-2-propanol acetate was added to bring the solids to 70%.

| Polymer "B" Silicon Modified Cycloaliphatic Polyester, 50% Silicone | |
| --- | --- |
| Ingredient | grams |
| Cycloaliphatic Polyester "A" (above) | 2000.0 |
| 1-methoxy-2-propanol acetate | 333.4 |
| cyclohexanone | 560.0 |
| SY 231[3] | 1573.2 |
| tetrabutyl titanate | 1.4 |
| 1-methoxy-2-propanol acetate | 186.6 |
| 1-butanol | 186.6 |

[3]Silicone intermediate made by Wacker-Chemie 2,000 grams of the cycloaliphatic polyester resin solution was weighed into a 5 liter resin reaction flask equipped as above. The resin solution was further reduced with 333.3 grams of additional 1-methoxy-2-propanol acetate and 560.0 grams of cyclohexanone. The resin solution was heated to 135° C. and a premix of SY 231 and tetrabutyl titanate was added. During the addition, the temperature dropped to 108° C. and the batch was reheated to 130°–135° C. where it was held for 1.75 hours while removing methanol until a viscosity of X was obtained. The silicone modified resin solution was subsequently cooled and further reduced with 186.6 grams of 1-methoxy-2-propanol acetate and 186.6 grams of 1-butanol. The resulting solution had a solids content of 58.5%, viscosity of Q-R, acid value of 3.8 (mg KOH/gram resin solids) and weight per gallon of 8.99.

A cycloaliphatic polyester was made for blending with the above silicone modified cycloaliphatic polyester to lower the silicone content from 50% to 30%:

| Polymer "C" Cycloaliphatic Blending Polyester | | |
| --- | --- | --- |
| Ingredient | grams | moles |
| neopentyl glycol[4] | 235.1 | 2.26 |
| 1,4-cyclohexanedicarboxylic acid | 264.1 | 1.54 |
| hexahydrophthalic anhydride | 732.2 | 4.75 |
| 1,4-cyclohexanedimethanol, 90% | 299.9 | 1.87 |
| butyl stannoic acid | 1.7 | |
| xylene | 52.5 | |
| Aromatic 150 solvent | 566.6 | |
| Aromatic 100 solvent | 514.1 | |

[4]2,2-dimethyl-1,3-propanediol

Neopentyl glycol, 1,4-cyclohexanedicarboxylic acid, hexahydrophthalic anhydride, 1,4-cyclohexanedimethanol and butyl stannoic acid were charged to a 3 liter resin flask equipped with an agitator, packed column, condenser, thermometer and inert gas inlet. The reactor was flushed with inert gas and the reactants heated to 230° C. while removing the water of reaction. This temperature was held until the acid value was 5.1 and the viscosity was Z at 60% solids in xylene. The polymer was then cooled and reduced with the Aromatic 150 solvent and the Aromatic 100 solvent. The resulting polymer solution had a solids content of 60%, viscosity of Z3, acid value of 4.8 and weight per gallon of 8.66.

Coating Formulations:

Coatings were made by first dispersing 235.6 grams of a red iron oxide pigment in 341.4 grams of "Polymer B" until a Hegman reading of 7+ was obtained. Subsequently, 209.4 grams of "Polymer C", 157.1 grams of Resimene 872, 15.0 grams of Syloid 74, 30.7 grams of 1-butanol, 16.1 grams of Aromatic 150, 4.3 grams of isophorone, 43.0 grams of cyclohexanone, and 2.5 grams of a blocked p-toluenesulfonic acid solution were added and mixed. The paint was then adjusted to 25–30 seconds on a #4 Zahn cup using cyclohexanone.

The coating composition was applied to galvanized steel panels with a #30 wire wound draw down bar and baked for 35 seconds at 600° F. to yield 0.8 mil films. These films had H pencil hardness, 4T flexibility with no cracking and were solvent resistant. Films exposed in a QUV cabinet for 1000 hours retained 70% of their initial gloss compared to 9% for a competitive silicone modified polyester made with aromatic dicarboxylic acids.

EXAMPLE 2

(Compositions For Spray Application)

Polymer Formulations:

| Polymer "D" Cycloaliphatic Polyester | | |
| --- | --- | --- |
| Ingredient | grams | moles |
| trimethylolethane[1] | 4868.0 | 40.57 |
| hexahydrophthalic anhydride[2] | 3348.1 | 21.74 |
| 1,4-cyclohexanedicarboxylic acid | 3739.1 | 21.74 |
| 2,2-dimethyl-1,3-propanediol | 2109.7 | 20.28 |
| 1,4-cyclohexanedimethanol | 2921.0 | 20.28 |
| tetrabutyl titanate | 14.0 | |
| methylisoamyl ketone[3] | 3945.3 | |

[1]2-hydroxymethyl-2-methyl-1,3-propanediol
[2]hexahydro-1,3-isobenzofurandione
[3]5-methyl-2-hexanone The trimethylolethane, hexahydrophthalic anhydride, 1,4-cyclohexanedicarboxylic acid, 2,2-dimethyl-1,3-propanediol, 1,4-cyclohexanedimethanol and tetrabutyl titanate were charged to a 22 liter resin reaction flask equipped with an agitator, packed column, condenser, thermometer and inert gas inlet. The reactor was flushed with inert gas and the reactants heated to 242° C. over a period of about 8.5 hours while removing water. When the temperature reached 242° C., the acid value was 10.3 and the viscosity at 70% solids in methyl isoamyl ketone was N—O (Gardner Bubble). The batch was immediately cooled and diluted with 3945.3 grams of methyl isoamyl ketone.

| Polymer "E" Silicon Modified Cycloaliphatic Polyester, 50% Silicone | |
| --- | --- |
| Ingredient | grams |
| Cycloaliphatic Polyester "D" (above) | 10,312.6 |
| SY 550* | 9,269.8 |
| tetrabutyl titanate | 8.2 |
| methyl isoamyl ketone | 1,979.8 |
| n-butyl acetate | 989.9 |
| 1-butanol | 330.0 |

*Silicone intermediate made by Wacker-Chemie 10,312.6 grams of the cycloaliphatic polyester resin solution, "D" was weighed into a 22 liter resin reaction flask equipped as above. The resin solution was heated to 140° C.

and a premix of 9,269.8 grams of SY 550 and 8.2 grams of tetrabutyl titanate was added. During the addition, the temperature dropped to 102° C. and the batch was reheated to 135°–137° C. while removing 817.6 grams of methanol. The silicone modified resin solution was subsequently cooled and further reduced with 1,979.8 grams of methyl isoamyl ketone, 989.9 grams of n-butyl acetate and 330.0 grams of 1-butanol. The resulting solution had a solids content of 80.4%, viscosity of W-X, and weight per gallon of 9.15.

Coating Formulation:

Coatings were prepared by dispersing 228.9 grams of red iron oxide pigment in 544.5 grams of Polymer E above until a Hegman reading of 7+ was obtained. Subsequently, 122.9 grams of Cymel 1161, 78.6 grams of n-butyl acetate, 16.2 grams of toluene and 7.3 grams of methyl ethyl ketone were added and mixed. Blocked dinonylnaphthalene disulfonic acid was added to obtain cured films at the required bake schedule. The coating was spray applied with an air atomized spray system onto primed aluminum panels and baked for 20 minutes at 400° F. The resulting films were 1.0–1.2 mils thick and had 2H pencil hardness. Films exposed in a QUV cabinet for 1000 hours retained 60% of their initial gloss compared to 48% for a silicone modified polyester made with aromatic dicarboxylic acids.

Example 4 and Comparative Example 5

| Cycloaliphatic Polyester Prepolymer (Polymer "F") | | |
| --- | --- | --- |
| Ingredient | grams | moles |
| 1,4-cyclohexanedimethanol | 649.6 | 4.51 |
| 1,6-hexanediol | 213.0 | 1.81 |
| trimethylolpropane[1] (TMP) | 655.8 | 4.89 |
| neopentyl glycol | 13.3 | 0.13 |
| hexahydrophthalic anhydride[2] (HHPA) | 984.8 | 6.39 |
| 1,4-cyclohexanedicarboxylic acid | 529.7 | 3.08 |
| tetrabutyl titanate | 1.7 | |
| Aromatic 200 solvent (Exxon) | 692.6 | |
| diethylene glycol butyl ether acetate | 673.4 | |

[1]2-ethyl-2-hydroxymethyl-1-3-propanediol
[2]hexahydro-1,3-isobenzofurandione

The 1,4-cyclohexanedimethanol, 1,6-hexanediol, trimethylolpropane, neopentyl glycol, hexahydrophthalic anhydride, 1,4-cyclohexanedicarboxylic acid, and tetrabutyl titanate were charged into a 5 liter reaction flask equipped with an agitator, packed column, condenser, thermometer, and inert gas inlet. The reactor was flushed with inert gas and the reactants were heated to 230° C. while removing water. The reaction was continued until the acid value was 8.4 (mg KOH/gram resin solids) and the viscosity of a sample at 70% solids in xylene was Y (Gardner Holt). The batch was cooled and diluted with Aromatic 200 solvent and diethylene glycol butyl ether acetate to 65% solids.

| Silicon-Modified Cycloaliphatic Polyester, 30% Silicon (Polymer "G") | |
| --- | --- |
| Ingredient | grams |
| Polymer F | 2913.2 |
| cyclohexanone | 421.9 |
| SY-231[3] | 900.0 |
| tetrabutyl titanate | 1.2 |
| ethylene glycol monobutyl ether | 166.6 |
| diethylene glycol butyl ether acetate | 44.2 |

[3]silicon intermediate made by Wacker-Chemie

The cycloaliphatic polyester F solution and cyclohexanone were charged to a five liter flask equipped as above. The contents of the flask were heated to 135°–140° C. under an inert atmosphere. The SY-231 and tetrabutyl titanate were added, cooling the reaction mixture to 116° C. The reaction mixture was reheated to 124°–126° C. where it was held for 4 hours while removing methanol until a viscosity of Z was obtained. The reaction mixture was cooled and reduced with ethylene glycol monobutyl ether and diethylene glycol butyl ether acetate. The resulting solution has a solids content of 63.8% viscosity of W-, acid value of 6.9 and weight per gallon of 9.05.

A cycloaliphatic polyester was made for blending with the above silicon-modified polyester to lower the silicon content to 8%.

| Cycloaliphatic Blending Polyester (Polymer "H") | | |
| --- | --- | --- |
| Ingredient | grams | moles |
| trimethylol ethane[4] | 258.2 | 2.15 |
| neopentyl glycol | 14.6 | 0.14 |
| 1,6-hexanediol | 227.0 | 1.92 |
| 1,4-cyclohexanedimethanol | 847.6 | 5.89 |
| hexahydrophthalic anhydride | 1016.3 | 6.60 |
| 1,4-cyclohexanedicarboxylic acid | 395.2 | 2.30 |
| butyl stannoic acid | 1.7 | |
| Aromatic 150 solvent | 792.8 | |
| Aromatic 100 solvent | 743.7 | |

[4]2-methyl-2-hydroxymethyl-1,3-propanediol

Trimethylolethane, neopentyl glycol, 1,6-hexanediol, 1,4-cyclohexanedimethanol, hexahydrophthalic anhydride, 1,4-cyclohexanedicarboxylic acid, and butyl stannoic acid were charged to a 5 liter flask fitted with a packed column, inert gas inlet, agitator, and thermometer. The reactor was flushed with inert gas and the contents heated to 230° C. while removing water generated during the reaction. This temperature was held until the acid value was 8.9 and a sample diluted to 60% solids in xylene had an L-M viscosity. The polymer was cooled and diluted with Aromatic 150 and Aromatic 100 solvents. The resultant polymer solution had a solids content of 60.9%, viscosity of X, acid value of 4.7, and weight per gallon of 8.66.

Coating Formulation:

Coatings were made by first dispersing 332.3 grams of titanium dioxide (R-960, DuPont) in 146.0 grams of polymer G, 145.0 grams of polymer H, 33.7 grams of Resamins 872 (Monsanto), and 17.1 grams of Aromatic 150 solvent until a Hegman reading of 7+ was obtained. Subsequently, 145.0 grams of polymer H, 48.3 grams of Cymel 303 (Cytec), 10.9 grams of isophorone, 14.8 grams of DBE mixed dibasic ester (DuPont), 63.9 grams of Aromatic 150 solvent, 2.2 grams of Dislon 1970 (King Industries), 2.2 grams of Modaflow 2100 (Monsanto), 1.1 grams of 67% polyethylene wax solution, 10.0 grams of Syloid 74x6000 Silica (W. R. Grace), and 5.0 grams of Nacure 2500 blocked PTSA solution (King Industries) were added and mixed thoroughly. The paint was adjusted to a viscosity of 25 seconds on a #4 Zahn cup using Aromatic 150 solvent.

Aromatic Polymer Formulation (Comparative Example 5)

Aliphatic Polyester Prepolymer (Polymer "I")

| Ingredient | grams | moles |
|---|---|---|
| 1,6-hexanediol | 208.0 | 1.76 |
| trimethylolpropane (TMP) | 616.7 | 4.60 |
| neopentyl glycol | 516.4 | 4.97 |
| phthalic anhydride | 965.1 | 6.52 |
| isophthalic acid | 521.3 | 3.14 |
| butyl stannoic acid | 2.9 | |
| Aromatic 200 solvent (Exxon) | 742.0 | |
| diethylene glycol butyl ether acetate | 658.0 | |

The 1,6-hexanediol, trimethylolpropane, neopentyl glycol, phthalic anhydride, isophthalic acid, and butyl stannoic acid were charged into a 5 liter reaction flask equipped with an agitator, packed column, condenser, thermometer, and inert gas inlet. The reactor was flushed with inert gas, and the reactants were heated to 230° C. while removing water. The reaction was continued until the acid value was 2.2. The batch was cooled and diluted with Aromatic 200 solvent and diethylene glycol butyl ether acetate to 65% solids.

Silicon-Modified Aromatic Polyester, 30% Silicon (Polymer "J")

| Ingredient | grams |
|---|---|
| Aromatic polyester I | 2683.8 |
| cyclohexanone | 324.0 |
| SY-231 | 810.0 |
| tetrabutyl titanate | 1.1 |
| ethylene glycol monobutyl ether | 144.0 |
| diethylene glycol butyl ether acetate | 168.3 |

The aromatic polyester solution I and cyclohexanone were charged to a five liter flask equipped as above. The contents of the flask were heated to 135°–140° C. under an inert atmosphere. The SY-231 and tetrabutyl titanate were added, cooling the reaction mixture to 113° C. The reaction mixture was reheated to 124°–126° C. where it was held for four hours while removing methanol until a viscosity of Z5 was obtained. The reaction mixture was cooled and reduced with ethylene glycol monobutyl ether and diethylene glycol butyl ether acetate. The resulting solution has a solids content of 62.2%, viscosity of Z1–Z2, acid value of 1.6 (mg KOH/gram resin solids) and weight per gallon of 9.21.

An aromatic polyester was made for blending with the above silicon-modified polyester to lower the silicon content to 8%.

Aromatic Blending Polyester (Polymer "K")

| Ingredient | grams | moles |
|---|---|---|
| Trimethylol ethane | 292.8 | 2.44 |
| neopentyl glycol | 961.5 | 9.25 |
| adipic acid | 178.0 | 1.22 |
| isophthalic acid | 607.3 | 3.66 |
| phthalic anhydride | 722.0 | 4.88 |
| butyl stannoic acid | 2.8 | |
| Aromatic 150 solvent | 1500.0 | |
| Aromatic 100 solvent | 166.8 | |

Trimethylolethane, neopentyl glycol, adipic acid, isophthalic acid, phthalic anhydride, and butyl stannoic acid were charged to a 5 liter flask fitted with a packed column, inert gas inlet, agitator, and thermometer. The reactor was flushed with inert gas and the contents heated to 230° C. while removing water generated during the reaction. This temperature was held until the acid value was 4.5 and a sample diluted to 60% solids in xylene had a W viscosity. The polymer was cooled and diluted with Aromatic 150 and Aromatic 100. The resultant polymer solution had a solids content of 60.0%, viscosity of Y, acid value of 4.5, and weight per gallon of 8.80.

Coating Formulation:

Coatings were made by first dispersing 307.2 grams of titanium dioxide (R-960, DuPont) in 124.0 grams of polymer J, 168.8 grams of polymer K, 34.9 grams of Resamine 872 (Monsanto), and 42.1 grams of Aromatic 150 solvent until a Hegman reading of 7+ was obtained. Subsequently, 168.8 grams of polymer K, 52.4 grams of Cymel 303 (Cytec), 16.8 grams of isophorone, 16.8 grams of DBE mixed dibasic ester (DuPont), 16.3 grams of Aromatic 150 solvent, 1.7 grams of Dislon 1970 (King Industries), 1.7 grams of Modaflow 2100 (Monsanto), 0.8 grams of a polyethylene wax solution, 8.4 grams of Syloid 74x6000 Silica (W. R. Grace), and 5.1 grams of Nacure 2500 blocked PTSA solution (King Industries) were added and mixed thoroughly. The paint was adjusted to a viscosity of 25 seconds on a #4 Zahn cup using Aromatic 150 solvent.

Panel Preparation:

Both cycloaliphatic (Ex. 4) and aromatic coatings (Ex. 5) were applied side-by-side using a #30 wire-wound rod to a hot dip galvanized steel panel (0.019 inch thick) previously coated with a polyurethane primer. The panel was placed in a 600° F. oven to give a coated panel with 0.8 mil dry film thickness. The panels were heated for various times, resulting in the different peak metal temperatures in Table A. Table B compares panels baked at a peak metal temperature of 450° F. Coating properties are set forth in Tables A and B below.

TABLE A

| | Ex. 4 Polymers G, H | | | | | Ex. 5 Polymers J, K | | | | |
|---|---|---|---|---|---|---|---|---|---|---|
| Peak metal temp (°F.) | 390 | 400 | 420 | 450 | 480 | 390 | 400 | 420 | 450 | 480 |
| Bend | | | 2T | 2T | 2T | | | 2T | 2T | 2T |
| Aged Bend (4 mo.) | | 2T | 2T | 2T | 3T | | | 2T | 2T | |
| Pencil* | F | 2H | 3H | 3H | 3H | H | 3H | 3H | 3H | 4H |
| Boil H$_2$O | | | | | | | | | | |
| 1 hr. | HB | H | | 3H | 3H | 2B | HB | | 3H | 3H |
| 2 hr. | B | HB | | 3H | 3H | 2B | HB | | 3H | 3H |
| 3 hr. | 2B | HB | | 2H | 3H | 2B | B | | 2H | 3H |
| 4 hr. | 2B | B | | F | 2H | 3B | B | | H | 2H |
| 8 hr. | | | | F | H | | | | H | H |

TABLE A-continued

|  | Ex. 4 Polymers G, H | | | | | | Ex. 5 Polymers J, K | | | |
|---|---|---|---|---|---|---|---|---|---|---|
| Stain | F | P | P | P | P | P | P | P | P | P |
| Recoat |  |  |  | P |  |  |  |  | F |  |
| Falling Sand |  |  | 29 L/mil |  |  |  |  | 25 L/mil |  |  |
| Appearance Clear |  | CLEAR |  |  |  |  | HAZY |  |  |  |
| Tabor Abrasion |  |  | .000078 g/cycle |  |  |  |  | .000072 g/cycle |  |  |
| Leneta** |  |  |  | P |  |  |  |  | F |  |
| RI*** before QUV |  | P | P | P |  |  |  |  | P |  |
| RI*** after QUV |  | F | F | F |  |  |  |  | F |  |
| Color Shift on overbake |  |  | .03 L |  |  |  |  | .17 L |  |  |
| in white |  |  | −.22 A |  |  |  |  | .01 A |  |  |
|  |  |  | −.43 B |  |  |  |  | .06 B |  |  |
| MEK Rubs |  | 100 | 100 | 100 |  |  | 100 | 100 | 100 |  |
| Saponification**** |  | 8F | 8F | 8F |  |  | 0 | 0 | 0 |  |
| Color Shift on overbake |  |  | 1.02 L |  |  |  |  | .12 L |  |  |
| (500 F.) in clear |  |  | −.23 A |  |  |  |  | −0.8 A |  |  |
|  |  |  | .18 B |  |  |  |  | .03 B |  |  |

*Hardness: Soft 3B 2B B HB F H 2H Hard
**in P samples, popping at 6 mil wet, in F samples popping at 1.5 mil wet
***Reverse Impact
****1N NaOH, 110° F., 24 hrs.

TABLE B

|  | Ex. 4 | | | | Ex. 5 | | | |
|---|---|---|---|---|---|---|---|---|
|  | ΔE | % GR | Chalk | % Adh. Fail | ΔE | % GR | Chalk | % Adh. Loss |
| QUV(1) | .56 | 55 | 10 | 2 | .85 | 12 | 10 | 1% |
|  | Scribe | | Field | | Scribe | | Field | |
| 140 F. Humidity(1) | 1 | | 7 VD | | 1 | | 7 D | |
|  | Scribe | Field | Edge | | Scribe | Field | Edge | |
| SaltSpray(1) | 3 | 10 | 4 | | 1 | 10 | 3 | |

(1)1000 hours

What is claimed is:

1. A coating composition comprising
   A) an adduct comprising polyester chains adducted to silicone resin, said silicone resin comprising between about 5 and about 30 weight percent of said adduct, said polyester chains comprising between about 70 and about 95 weight percent of said adduct, said polyester chains having hydroxyl numbers of between about 10 and about 120, said polyester chains being formed from polyfunctional alcohols and polyfunctional acids and/or anhydrides, plus
   B) a hydroxyl-reactive cross-linking agent provided at at least about one-half the stoichiometric equivalent of hydroxyl functionality of said polyester;
   the improvement wherein 100 percent of said polyfunctional acids and/or anhydrides of said polyester chains are cyclohexane dicarboxylic acid(s) or anhydride(s) and 100 percent of said polyfunctional alcohols of said polymer chain are aliphatic or cycloaliphatic, whereby improved coatability and re-coatability is achieved in said coating composition.

2. An adduct comprising polyester chains adducted to silicone resin, said silicone resin comprising between about 5 and about 30 weight percent of said adduct, said polyester chains comprising between about 70 and about 95 weight percent of said adduct, said polyester chains having hydroxyl numbers of between about 10 and about 120, said polyester chains being formed from polyfunctional alcohols and polyfunctional acids and/or anhydrides,
   the improvement wherein 100 percent of said polyfunctional acids and/or anhydrides of said polyester chains are cyclohexane dicarboxylic acid(s) or anhydride(s) and 100 mole percent of said polyfunctional alcohols of said polymer chain are aliphatic or cycloaliphatic.

* * * * *